US 6,934,805 B2

(12) United States Patent
Hickman et al.

(10) Patent No.: US 6,934,805 B2
(45) Date of Patent: Aug. 23, 2005

(54) METHOD AND APPARATUS FOR MANAGING COMPUTER STORAGE DEVICES FOR IMPROVED OPERATIONAL AVAILABILITY

(75) Inventors: John Edward Hickman, Salinas, CA (US); Michael Nghiem Nguyen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 10/441,512

(22) Filed: May 19, 2003

(65) Prior Publication Data

US 2004/0236907 A1 Nov. 25, 2004

(51) Int. Cl.⁷ .............................................. G06F 12/00
(52) U.S. Cl. ........................ 711/114; 711/165; 711/203
(58) Field of Search ............................. 711/114, 165, 711/203

(56) References Cited

U.S. PATENT DOCUMENTS

| | | |
|---|---|---|
| 5,212,784 A | 5/1993 | Sparks |
| 5,297,258 A | 3/1994 | Hale et al. |
| 5,432,922 A | 7/1995 | Polyzois et al. |
| 5,917,998 A | 6/1999 | Cabrera et al. |
| 6,243,828 B1 * | 6/2001 | Chase-Salerno et al. ....... 714/6 |
| 6,377,959 B1 | 4/2002 | Carlson |
| 6,397,348 B1 | 5/2002 | Styczinski |
| 6,748,485 B1 * | 6/2004 | Yokota et al. .............. 711/112 |
| 2003/0188304 A1 | 10/2003 | Goodman et al. |

* cited by examiner

*Primary Examiner*—Reba I. Elmore
(74) *Attorney, Agent, or Firm*—Timothy N. Ellis (57) ABSTRACT

A method and apparatus for managing computer storage devices and updating code in a computing system. An example of the method begins by mirroring at least one logical volume in an original volume group across a first storage device and a second storage device, and then ceasing mirroring the at least one logical volume on the second storage device. The first storage device is kept on-line with the computing system, and information is copied from the first storage device to the second storage device to clone the information from the first storage device. Code is then updated in an alternate volume group on the second storage device, while the computing system is operated with the original volume group on the first storage device. The computing system is then booted from the alternate volume group on the second storage device.

24 Claims, 5 Drawing Sheets

METHOD AND APPARATUS FOR MANAGING COMPUTER STORAGE DEVICES FOR IMPROVED OPERATIONAL AVAILABILITY

BACKGROUND

1. Technical Field

The present invention relates to configuring and managing storage devices in a computing system to improve operational availability of the computing system. More particularly, the invention concerns a method and apparatus for managing storage devices, that provides data mirroring, and that also permits updating code while continuing to operate the computing system with at least one of the storage devices.

2. Description of Related Art

It is desirable for computing systems to have maximum operational availability and as little downtime as possible. Problems related to disk drives can result in system down time. For example, down time can result from disk drive hardware failures, and errors caused by code updates.

Using a single disk drive can result in significant downtime if the disk drive has a hardware failure. Downtime resulting from hardware failures can be reduced by using two disk drives, with the computing system configured to redundantly store information on both of the drives. This configuration, which is referred to as mirroring across the drives, reduces problems related to single disk drive failures, because if one of the drives fails the system can continue to operate with the other drive.

It is frequently desirable to update computer code, for example operating system code, on disk drives. If code updates are implemented on drives that are operated in a mirrored configuration, any problems caused by the updated code will affect both drives, and will likely result in system downtime.

Consequently, existing configurations for operating disk drives in computing systems are not completely adequate for minimizing downtime related to hardware failures and code update errors.

SUMMARY

One aspect of the invention is a method for managing storage devices, for example disk drives, and updating code in a computing system. An example of the method includes mirroring at least one logical volume in an original volume group on a first storage device and a second storage device, and then ceasing mirroring the at least one logical volume on the second storage device. The first storage device is kept on-line with the computing system, and information is copied from the first storage device to the second storage device to create a clone of the information from the first storage device. Code is then updated in an alternate volume group on the second storage device, while the computing system operates with the original volume group on the first storage device. The computing system is then booted from the alternate volume group on the second storage device.

Other aspects of the invention are described in the sections below, and include, for example, a storage apparatus, and a signal bearing medium tangibly embodying a program of machine-readable instructions executable by a digital processing apparatus to perform a method for managing storage devices and updating code in a computing system.

The invention provides a number of advantages. Broadly, the invention provides improved reliability and operational availability of a computing system, and minimizes the instances where a disk drive rebuild is necessary to restore operation. More specifically, the invention advantageously provides protection from disk drive hardware failures, and permits keeping the computing system operating while code is updated, and also permits updating code quickly. The invention also provides a number of other advantages and benefits, which should be apparent from the following description.

DETAILED DESCRIPTION

The nature, objectives, and advantages of the invention will become more apparent to those skilled in the art after considering the following detailed description in connection with the accompanying drawings.

I. Hardware Components and Interconnections

One aspect of the invention is a computing system that is configured to provide data mirroring across at least two storage devices, and to permit updating code while the system remains operational with at least one of the storage devices. As an example, the system may be embodied by the hardware components and interconnections of the multi-server computing system 100 shown in FIG. 1. The computing system 100 could be implemented, for example, in a model 2105–800 Enterprise Storage Server, manufactured by International Business Machines Corporation. As an example, the computing system 100 may be used for processing and storing data for banks, governments, large retailers, and medical care providers.

The system 100 includes a first cluster 102, and a second cluster 104. In alternative embodiments, the computing system 100 may have a single cluster or more than two clusters. Each cluster has at least one processor. As an example, each cluster may have four or six processors. In the example shown in FIG. 1, the first cluster 102 has six processors 106a, 106b, 106c, 106d, 106e, and 106f, and the second cluster 104 also has six processors 108a, 108b, 108c, 108d, 108e, and 108f. Any processors having sufficient computing power can be used. As an example, each processor 106a–f, 108a–f, may be a PowerPC RISC processor, manufactured by International Business Machines Corporation. The first cluster 102 also includes a first storage memory 110, and similarly, the second cluster 104 includes a second storage memory 112. As an example, the storage memories 110, 112, may be called fast access storage, and may be RAM. The storage memories 110, 112 may be used to store, for example, data, and application programs and other programming instructions executed by the processors 106a–f, 108a–f. The two clusters 102, 104 may be located in a single enclosure or in separate enclosures. In alternative embodiments, each cluster 102, 104 could be replaced with a supercomputer, a mainframe computer, a computer workstation, and/or a personal computer.

Figure 1:
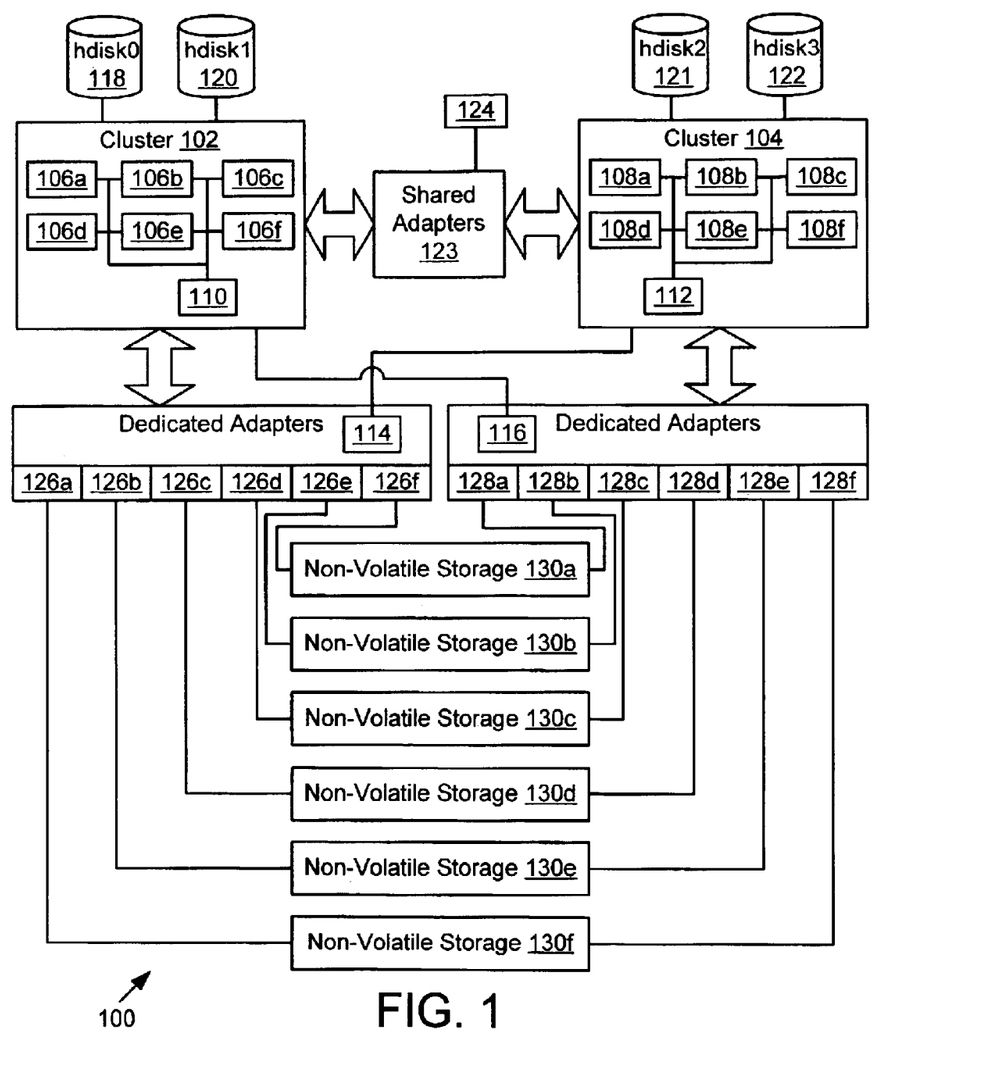
FIG. 1 is a block diagram of the hardware components and interconnections of a computing system in accordance with an example of the invention.

The first cluster 102 is coupled to NVRAM 114 (non-volatile random access memory), which is included with a first group of dedicated adapters 126a–f (discussed below). Similarly, the second cluster 104 is also coupled to NVRAM 116, which is included with a second group of dedicated adapters 128a–f (discussed below). Additionally, the first cluster 102 is coupled to the NVRAM 116, and the second cluster 104 is coupled to the NVRAM 114. As an example, data operated on by cluster 102 is stored in storage memory 110, and is also stored in NVRAM 116, so that if cluster 102 becomes unoperational, the data will not be lost and can be operated on by cluster 104. Similarly, as an example, data operated on by cluster 104 is stored in storage memory 112, and is also stored in NVRAM 114, so that if cluster 104 becomes unoperational, the data will not be lost and can be operated on by cluster 102. The NVRAM 114, 116 may, for example, be able to retain data for up to about 48 hours without power.

Within the first cluster 102, two or more of the processors 106a–f may be ganged together to work on the same tasks. However, tasks could be partitioned between the processors 106a–f. Similarly, within the second cluster 104, two or more of the processors 108a–f may be ganged together to work on the same tasks. Alternatively, tasks could be partitioned between the processors 108a–f. With regard to the interaction between the two clusters 102, 104, the clusters 102, 104 may act on tasks independently. However, tasks could be shared by the processors 106a–f, 108a–f in the different clusters 102, 104.

The first cluster 102 is coupled to a first storage device, for example first hard drive 118, and is also coupled to a second storage device, for example second hard drive 120. Similarly, the second cluster 104 is coupled to a third storage device, for example third hard drive 121, and is also coupled to a fourth storage device, for example fourth hard drive 122. Alternatively, more than two storage devices could be coupled to the first cluster 102, and/or the second cluster 104. Each storage device may also be called a boot device. Additionally, each hard drive 118, 120, 121, 122 may also be referred to as a hard disk drive, a hard disk, a disk, a boot drive, or a system drive. In one example, the hard drives 118, 120, 121, 122 are hard disk drives. The hard drives 118, 120, 121, 122 may use magnetic, optical, magneto-optical, or any other suitable technology for storing data. The storage devices do not have to be hard drives, and may be any type of suitable storage. As an example, the storage devices could be any type of disk drive. As another example, the storage devices could be logical volumes in a storage RAID, or network devices. In other examples, each storage device could be an optical disk or disc (such as a CD-R, CD-RW, WORM, DVD-R, DVD+R, DVD-RW, or DVD+RW), a RAMAC, a magnetic data storage diskette, magnetic tape, digital optical tape, an EPROM, an EEPROM, or flash memory. The storage devices do not each have to be the same type of storage.

The first cluster 102, or the first cluster 102 together with the first storage device (for example, first hard drive 118) and the second storage device (for example, second hard drive 120) and any additional boot devices coupled to the first cluster 102, may be referred to as a first server, or computing system, or computing apparatus, or storage apparatus. Similarly, the second cluster 104, or the second cluster 104 together with the third storage device (for example, third hard drive 121) and the fourth storage device (for example, fourth hard drive 122) and any additional boot devices coupled to the second cluster 104, may be referred to as a second server, or computing system, or computing apparatus, or storage apparatus. The multi-server computing system 100 may also be referred to as a computing system, or computing apparatus, or storage apparatus.

Each of the clusters 102, 104 is coupled to shared adapters 123, which are shared by the clusters 102, 104. The shared adapters 123 can also be called host adapters. The shared adapters 123 may be, for example, PCI slots, and bays hooked to PCI slots, which may be operated by either cluster 102, 104. As an example, the shared adapters 123 may be SCSI, ESCON, FICON, or Fiber Channel adapters, and may facilitate communications with PCs and/or other hosts, such as PC 124.

Additionally, the first cluster 102 is coupled to a first group of dedicated adapters 126a–f, and the second cluster 104 is coupled to second group of dedicated adapters 128a–f. Each of the dedicated adapters 126a–f, 128a–f, is an interface between one of the clusters 102, 104, and a non-volatile storage in a group of non-volatile storages 130a–f. Each non-volatile storage 130a–f may be a high capacity memory system that is shared by the clusters 102, 104. As an example, each non-volatile storage 130a–f may include, for example, an array of eight magnetic hard disk drives (not shown). In other embodiments, other types of memory devices, such as optical, magneto-optical, or magnetic tape storage devices, could be used in the non-volatile storage, and larger or smaller numbers of memory devices could be included in each non-volatile storage 130a-f. As an example, each non-volatile storage 130a–f may be a storage enclosure in a model 2105 Enterprise Storage Server, manufactured by International Business Machines Corporation.

In one embodiment, each dedicated adapter 126a–f, 128a–f is a Serial Storage Architecture (SSA) adapter. Alternatively other types of adapters, for example SCSI or Fiber Channel adapters, could be used for one or more of the dedicated adapters 126a–f, 128a–f. Also, in other embodiments, larger or smaller numbers of dedicated adapters 126a–f, 128a–f and non-volatile storages 130a–f could be used. In one example, each of the non-volatile storages 130a–f is coupled to one of the dedicated adapters 126a–f that is coupled to the first cluster 102, and to one of the dedicated adapters 128a–f that is coupled to the second cluster 104. For example, non-volatile storage 130a is coupled to dedicated adapter 126f that is coupled to the first cluster 102, and non-volatile storage 130a is also coupled to dedicated adapter 128a that is coupled to the second cluster 104. Further, in one example each of the two dedicated adapters, for example dedicated adapters 126f and 128a, that are coupled to a particular non-volatile storage, for example non-volatile storage 130a, is a SSA and is coupled to the non-volatile storage 130a via two communication paths (not separately shown), so that a first serial loop is formed by dedicated adapter 126f and the memory devices in the non-volatile storage 130a, and a second serial loop is formed by dedicated adapter 128a and the memory devices in the non-volatile storage 130a. Each serial loop provides redundant communication paths between the memory devices in a particular non-volatile storage 130a and each dedicated adapter 126a, 128a coupled to the non-volatile storage 130a, which increases reliability.

II. Operation

In addition to the various hardware embodiments described above, a different aspect of the invention concerns a method for managing storage devices and updating code in a computing system.

A. Signal-Bearing Media

In the context of FIG. 1, such a method may be implemented, for example, by operating one or more of the processors 106a–f, 108a–f in the clusters 102, 104, to execute a sequence of machine-readable instructions, which can also be referred to as code. These instructions may reside in various types of signal-bearing media. In this respect, one aspect of the present invention concerns a programmed product, comprising a signal-bearing medium or signal-bearing media tangibly embodying a program of machine-readable instructions executable by a digital processing apparatus to perform a method for managing storage devices and updating code in a computing system.

Figure 2:
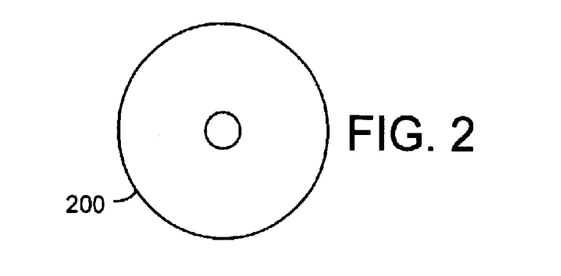
FIG. 2 is an example of a signal-bearing medium in accordance an example of the invention.

This signal-bearing medium may comprise, for example, the first hard drive 118, the second hard drive 120, the third hard drive 121, the fourth hard drive 122, and/or the storage memories 110, 112 in one or more of the clusters 102, 104. Alternatively, the instructions may be embodied in a signal-bearing medium such as the optical data storage disc 200 shown in FIG. 2. The optical disc can be any type of signal bearing disc or disk, for example, a CD-ROM, CD-R, CD-RW, WORM, DVD–R, DVD+R, DVD–RW, or DVD+RW. Whether contained in the computing system 100 or elsewhere, the instructions may be stored on any of a variety of machine-readable data storage mediums or media, which may include, for example, direct access storage (such as a conventional "hard drive", a RAID array, or a RAMAC), a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++".

B. Overall Sequence of Operation

For ease of explanation, but without any intended limitation, the method aspect of the invention is described with reference to the first server (the first cluster 102, the first hard drive 118, and the second hard drive 120) in the multi-server computing system 100 described above. The method may also be practiced with the second server, or by both the first server and the second server, in the multi-server computing system 100, or with any other suitable computing system. In general, the method utilizes a combination of mirrored and standby drive configurations to realize benefits of both configurations. During normal operations the two hard drives 118, 120 are configured to operate as a mirrored pair to protect against hardware failures. Then, as part of a code update process, the mirrored pair is ceased and the code is updated on the off-line hard drive 120, while the cluster 102 remains in operation with the hard drive 118, unaffected by the code update process in progress on the off-line hard drive 120. After the new level of code is loaded, the cluster 102 is rebooted from the updated hard drive 120. When it is determined that the new code level is acceptable, the two hard drives 118, 120 are returned to the mirrored configuration. Until mirroring is reestablished, either hard drive 118 with the downlevel code, or hard drive 120 with the updated code, can be used to operate the cluster 102. The code level that is in use is determined by which hard drive 118, 120 is configured as the primary boot device in the bootlist. This arrangement provides excellent protection from hard drive failures and code load and update problems, and also provides an advantageous recovery process from code load and update problems.

Each individual hard disk drive, such as the first hard drive 118 and the second hard drive 120 in the computing system 100 shown in FIG. 1, is referred to as a physical volume (PV), and is given a name, for example, hdisk0, hdisk1, etc. Before a physical volume (PV) can be used, it must be assigned to a volume group (VG). Each volume group may contain up to 128 physical volumes, but a physical volume may only be assigned to a single volume group. Within each volume group one or more logical volumes (LV) can be created to permit management of file systems, paging space, or other logical data types. Logical volumes can be increased, relocated, copied, and mirrored while the cluster 102 (or cluster 104) is in operation. Logical volumes are given names, for example, hd1, hd2, etc., and may have different file system types, which may include, for example, the journal file system (JFS) used in the UNIX operating system. Any logical volume that contains system programs, or user data, or user programs, must also be assigned to a filesystem (FS). The filesystem is an additional hierarchial structure used by high-level system software to organize data and programs into groups of directories and files referred to as a file tree. For example, a logical volume hd1 could be given the file system name "/tmp".

Figure 3A:
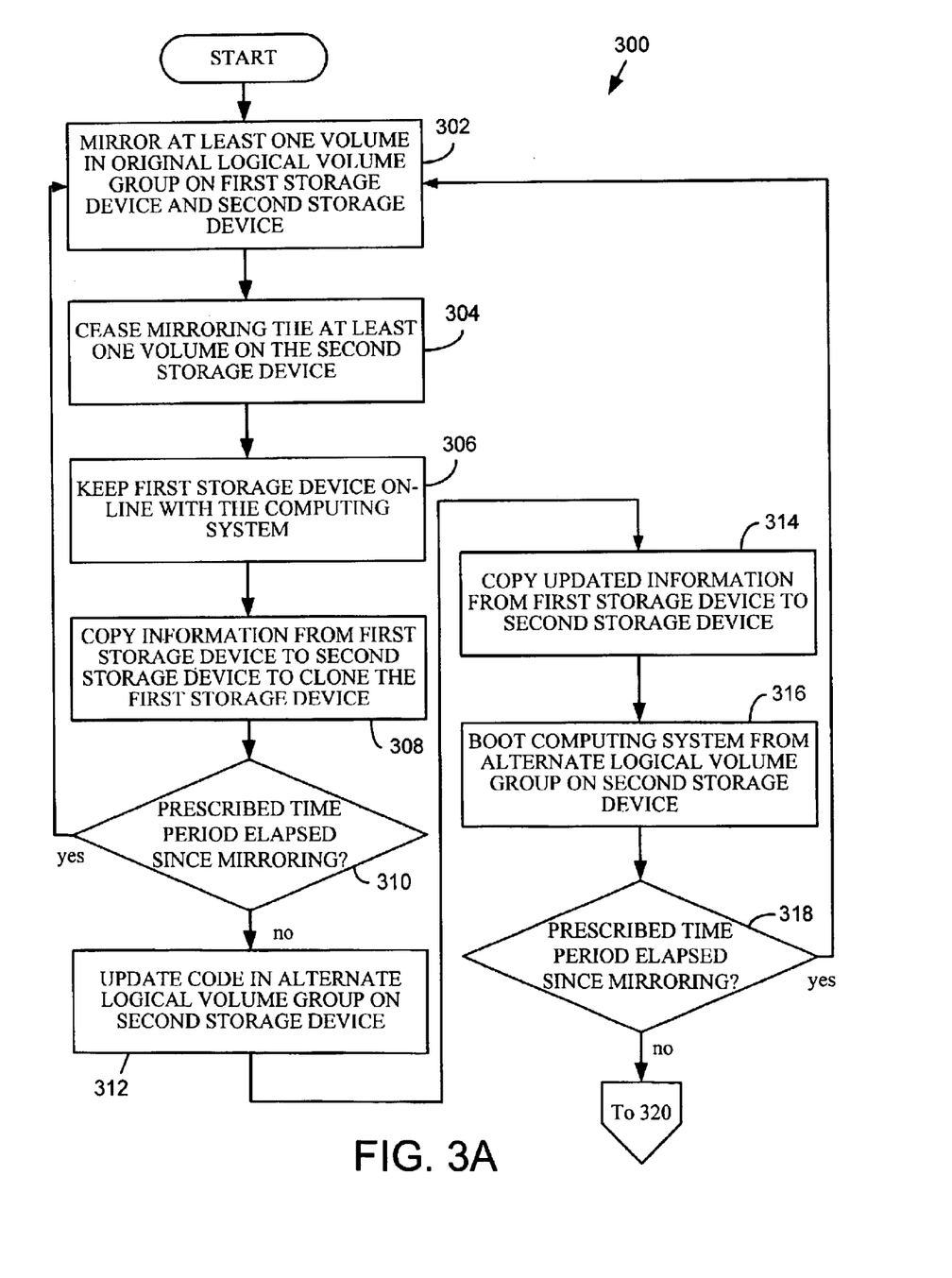
FIGS. 3A and 3B are a flowchart of an operational sequence for managing storage devices and updating code in a computing system in accordance with an example of the invention.
Figure 3B:
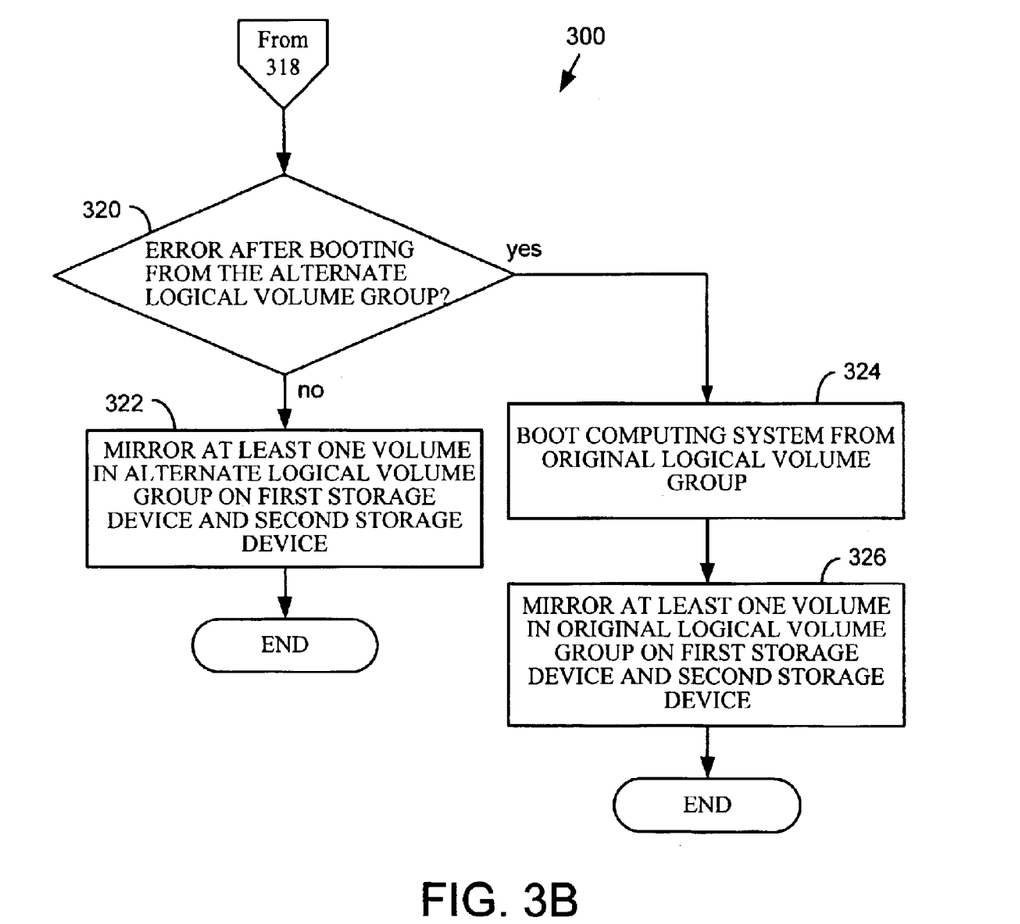

An example of the method aspect of the present invention is illustrated in FIGS. 3A and 3B, which show a sequence 300 for a method for managing storage devices and updating code in a computing system. In this discussion of this example of the invention, the first storage device is embodied by the first hard drive 118, and the second storage device is embodied by the second hard drive 120. However, the first storage device and the second storage device could be any types of suitable storage devices, as discussed above. The sequence 300, which in this example is performed by the cluster 102, begins with the operation 302 of mirroring at least one logical volume in an original volume group on at least a first storage device (for example, the first hard drive 118), and a second storage device (for example, the second hard drive 120). In an alternative embodiment, the mirroring could be implemented in a storage array environment, for example, wherein the at least one logical volume is striped onto different disks in a RAID. In another example, the mirroring could be implemented by mirroring the at least one logical volume onto storage devices located in different storage units. Further, the mirroring could be implemented in a synchronous remote data shadowing system, for example the Peer-to-Peer Remote Copy (PPRC) facility that is available from International Business Machines Corporation, or in an asynchronous remote data shadowing system, for example the Extended Remote Copy (XRC) facility that is also available from International Business Machines Corporation.

In one example, there are nine logical volumes in the original volume group, and eight of the nine logical volumes in the original volume group are mirrored. The original volume group may be a root volume group, which can be referred to as "rootvg".

As an example, the logical volumes are a UNIX default set, and the operating system is the AIX operating system. AIX uses a Logical Volume Manager (LVM) that employs a hierarchical structure to manage fixed-disk storage, and that permits mirroring and unmirroring while running the cluster 102 (or the cluster 104). The default installation of AIX has a single volume group (VG) named rootvg, that has nine logical volumes (LVs). Six of the logical volumes (LVs) in the rootvg are assigned to a file system (FS), one logical volume (LV) is a boot logical volume that contains the boot record, another logical volume (LV) is used for paging, and the remaining logical volume (LV) is used to manage the filesystem.

Systems that employ data mirroring have excellent recovery characteristics for single hard drive failures, and are highly fault tolerant with regard to hard drive failures. As long as one of the two hard drives 118, 120 is operational, the cluster 102 will remain one hundred percent functional, and the AIX operating system will continue to operate on the remaining hard drive without disruption. The invention permits replacing a hard drive 118, 120 while the cluster 102 is operating. Thus, a failed hard drive can be repaired by unplugging and replacing the hard drive while the cluster 102 is operating, or after the cluster 102 is quiesced and powered off. After a hard drive is replaced, mirroring can be restored. Restoring mirroring may include performing disk clean-up functions and resynchronizing the disks.

When logical volumes are mirrored across hard drives, the information on the mirrored hard drives is not necessarily identical. This contrasts with hard drive cloning, which produces an exact copy of a hard drive. When mirroring, it is not necessary to mirror all of the logical volumes in the original volume group on the first storage device (for example, hard drive 118) and the second storage device (for example, hard drive 120), and consequently, it is possible that at least one logical volume in the original volume group is not mirrored across the first storage device and the second storage device.

In this example of the method aspect of the invention, the at least one logical volume is mirrored across the first hard drive 118 and the second hard drive 120. However, in other embodiments more than two storage devices may be used for mirroring. As an example, one or more logical volumes in the original volume group could be mirrored on the first hard drive 118, the second hard drive 120, and a third hard drive (or other type of storage device), and possibly on one or more additional storage devices.

Continuing the discussion of the operations of the method aspect of the invention, in operation 304 shown in FIG. 3A, the mirroring of the at least one logical volume in the original volume group on the second storage device (for example, hard drive 120) is ceased. This means that updates to the at least one logical volume are no longer written on the second storage device. In operation 306 the first storage device (for example, hard drive 118) is kept on-line with the computing system. Although mirroring is ceased in operation 304, the first storage device remains on-line with the computing system (for example, the first cluster 102), which permits the cluster 102 to continue to operate with the first storage device. In operation 308, information is copied from the first storage device (for example, hard drive 118) onto the second storage device (for example, hard drive 120), to make the second storage device a clone of the first storage device. After the cloning is completed, the data on the first storage device and the second storage device is identical. The second storage device (for example, hard drive 120) provides a "point-in-time" snapshot backup disk image of the current boot disk (hard drive 118).

Version 4.3 of the AIX operating system provides a tool called "Alternate Disk Installation" that allows cloning the rootvg onto an alternate disk, where the rootvg is called altinst_rootvg. This tool can also be used to direct code update commands to the altinst_rootvg, using the alt_disk_install command. If the second hard drive 120 becomes the boot device, altinst_rootvg will automatically be renamed as the rootvg, thereby permitting the cluster 102 to boot from either hard drive 118, 120.

FIG. 3A additionally shows operation 310, which also maybe performed. Operation 310 comprises determining if a prescribed time period has elapsed since performing the operation 302 of mirroring at least one logical volume in the original volume group on at least the first storage device and the second storage device, and if so, again performing the operation 302 of mirroring at least one logical volume in the original volume group on at least the first storage device and the second storage device. If mirroring is resumed, the method may be continued by performing the operations following the mirroring operation 302, described above. If in operation 310 it is determined that the prescribed time period has not elapsed, the method continues with operation 312.

In operation 312, code in an alternate volume group on the second storage device (for example, hard drive 120) is updated while operating the computing system (cluster 102) with the original volume group on the first storage device (for example, hard drive 118). The operation of updating code in an alternate volume group on the second storage device may include first putting the cluster 102 in a transient updateclone state. If the original volume group is a root volume, then the alternate volume group is also a root volume. The code that is updated may be, for example, operating system code, device drivers, system configuration information, system code, interface code, kernel extensions, and/or application programs. Firmware may also be updated at approximately the same time that the code in the alternate volume group is being updated. In one example, code is updated to repair one or more system failures. The invention permits upgrading to new code without disturbing the current configuration or the current environment.

Hard drive 120, which is coupled to cluster 102, may as an example, be updated at about the same time as hard drive 122, which is coupled to cluster 104. In this example, after the code is updated in the hard drives 120, 122, the clusters 102, 104 may be rebooted in succession. Alternatively, hard drives 120 and 122 may be updated at different times. The invention permits updating code while the cluster that is coupled to the hard drive being updated remains in operation, unaffected by the code update process in progress on the (off-line) hard drive that is being updated. The code is updated with minimal downtime for the cluster receiving the update, with the downtime being limited to the time required for an Initial Microcode Load (IML). There is no down time for the computing system 100 in the concurrent mode.

FIG. 3A additionally shows operation 314, which also may be performed. Operation 314 comprises copying updated information from the first storage device (for example, hard drive 118) to the second storage device (for example, hard drive 120). The updated information is information that is updated on the first storage device after the operation 304 of ceasing mirroring the at least one logical volume in the original volume group on the second storage device.

In operation 316, the computing system 100 is booted from the alternate volume group on the second storage device (for example, hard drive 120). FIG. 3A additionally shows operation 318, which also may be performed. Operation 318 comprises determining if a prescribed time period has elapsed since performing the operation 302 of mirroring at least one logical volume in the original volume group on at least the first storage device and the second storage device, and if so, again performing the operation 302 of mirroring at least one logical volume in the original volume group on at least the first storage device and the second storage device. If mirroring is resumed, the method may be continued by performing the operations following the mirroring operation 302, described above. If in operation 318 it is determined that the prescribed time period has not elapsed, then the method continues with operation 320.

Referring now to FIG. 3B, operation 320 comprises determining whether there is an error after booting the cluster 102 from the alternate volume group on the second storage device (for example, hard drive 120). If in operation 320 it is determined that there is no error, then operation 322 may be performed. In operation 322 at least one logical volume in the alternate volume group is mirrored on at least the first storage device (for example, hard drive 118) and the second storage device (for example, hard drive 120), which is referred to as committing the new code. Committing the new code completes the code update process. If three storage devices are used (for example, three hard drives), and if there is no error after booting the cluster 102 from the alternate volume group, then the at least one logical volume in the alternate volume group may be mirrored across all three storage devices, or, the at least one logical volume in the alternate volume group may be mirrored across two of the storage devices while the original volume group is saved on the third storage device. The determination of whether the code update is successful (error free) can be conducted automatically by the cluster 102, or can be conducted by a human.

If there is an error after booting the cluster 102 from the alternate volume group on the second storage device (for example, hard drive 120), then operation 324 may be performed. In operation 324 the cluster 102 is booted from the original volume group, which is referred to as restoring the old code. After operation 324, operation 326, in which mirroring is resumed with the old code version, may be performed. Operation 326 comprises mirroring the at least one logical volume in the original volume group on at least the first storage device (for example, hard drive 118) and the second storage device (for example, hard drive 120).

Control of a cluster's code version is based upon management of the cluster's bootlist, which determines the cluster's boot device. The bootlist is controlled directly by the rsBootListCmd using a parameter, for example, rsBootListCmd -n. Also, to ensure that the actual device that the cluster 102 (or 104) boots from is the intended boot device, the rsBootChk command is called during each cluster Initial Microcode Load (IML). The rsBootChk command generates a problem log entry or a problem event whenever it detects a boot problem.

C. Operating States

Figure 4:
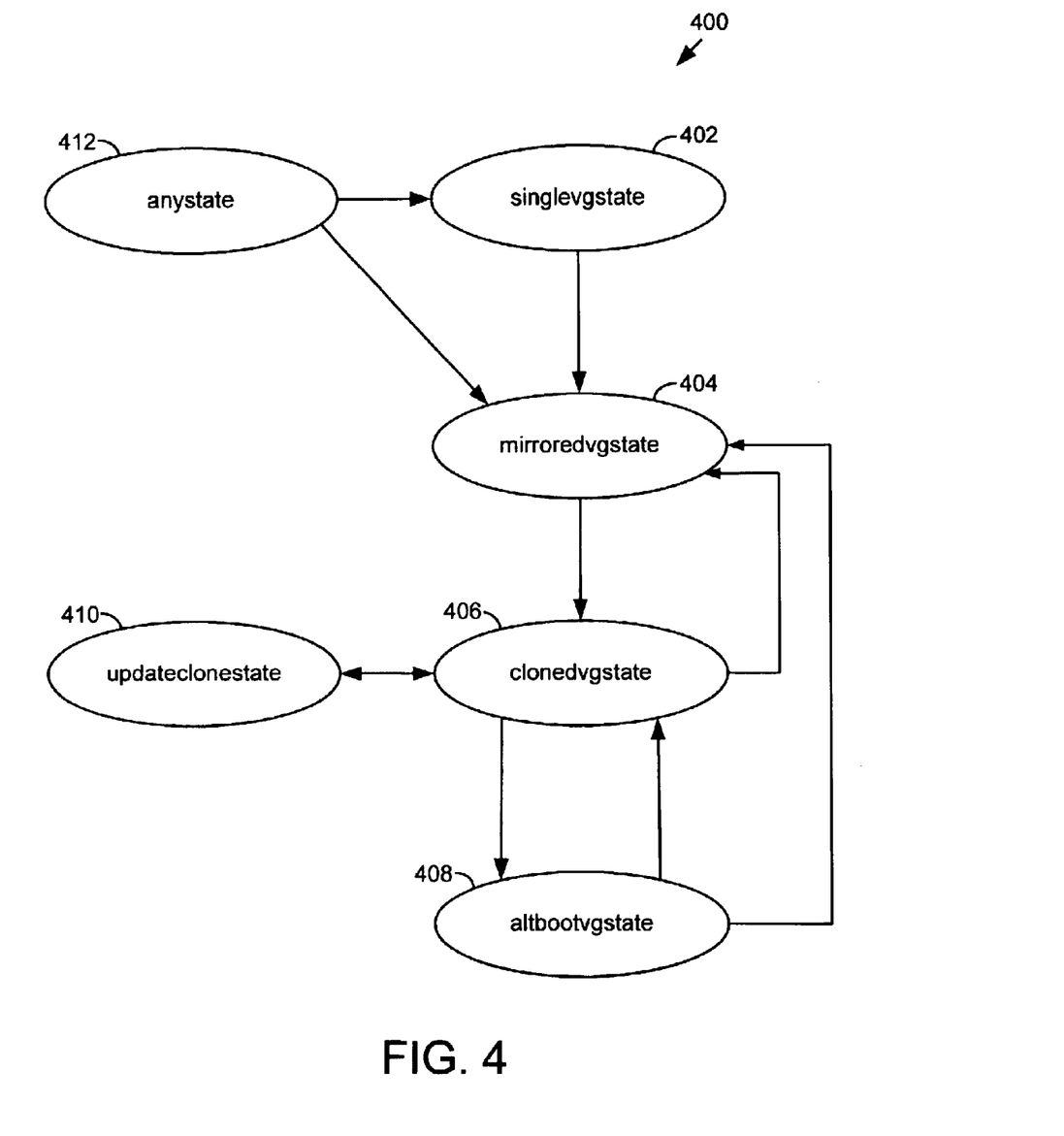
FIG. 4 is a state diagram in accordance with an example of the invention.

For ease of explanation, but without any intended limitation, the operating states and commands are described with reference to the first server (the first cluster 102, the first hard drive 118, and the second hard drive 120) in the multi-server computing system 100 described above. The volume groups in the storage devices (for example, hard drives 118, 120) coupled to the cluster 102 may be configured to be in any of five main states, which also may be referred to as the state of the cluster 102. These states are illustrated in the state diagram 400 (which may also be called a state machine), shown in FIG. 4, and in the state diagram 500 shown in FIG. 5. The states include four steady states, which are singlevgstate 402, mirroredvgstate 404, clonedvgstate 406, and altbootvgstate 408. ("vg" stands for "volume group".) The cluster 102 can operate with a volume group that is in a steady state. The fifth state, updateclonestate 410, is a transient state that is used only during the rsAltInst command. When the volume groups are in transition between states, the cluster 102 is in an additional state, called the "BUSY" state (not shown).

The command rsChangeVgState is used to manage volume state transitions. This command and other commands discussed herein may be utilized, for example, by Enterprise Storage Servers, (manufactured by International Business Machines Corporation), running the AIX operating system. The rsChangeVgState command calls the appropriate functions to get both storage devices (for example, hard drives 118, 120) and the bootlist set to their required conditions for the target state. Its input parameter is the target state name (for example, clonedvgstate). As an example, the following command can be used to take the cluster 102 to the mirrored mode: rsChangeVgState mirroredvgstate. The state transitions may be fully automated. State changes may be made without restrictions, except when in a protective condition. The current state and allowable states may be determined by using the lsvg and lsvg-p rootvg commands to reveal how many volume groups exist and the number of physical volumes (PV) assigned to the rootvg.

The five main valid states (shown in FIG. 5), are discussed below:

Singlevgstate 402: In this state there is only a single bootable copy of the root volume group "rootvg". The other storage device (for example a hard drive), may not be installed, it may be failing, it may be blank, it may contain some logical volumes of the rootvg or portions of other logical volumes, or it may contain a foreign volume group left over from elsewhere. The only valid final target state from the singlevgstate 402 is the mirroredvgstate 404. Singlevgstate 402 may be the target state from anystate 412, for example, when one hard drive becomes unavailable, or when the second hard drive is not a mirror or clone.

Mirroredvgstate 404: Mirroredvgstate 404 is the normal operating state of the cluster 102. The mirroredvgstate 404 may be the target state from anystate 412, clonedvgstate 406, or altbootvgstate 408. During normal operations the reliability, availability, and serviceability (RAS) internal code will attempt to maintain the cluster 102 in the mirroredvgstate 404. If a problem is detected while the cluster 102 is in the mirroredvgstate 404, the cluster 102 may automatically or manually transition to the singlevgstate 402. Also, the cluster 102 will be allowed to transition to the clonedvgstate 406 or altbootvgstate 408 for a prescribed period of time, for example up to 72 hours, after which it will be automatically returned to the mirroredvgstate 404 by a rsMirrorVgChk command. In other embodiments the prescribed period of time could be smaller or larger than 72 hours. As an example, if there is no touchfile/etc/rsmirrorvgoverride, the cluster 102 may be returned to the mirroredvgstate 404 after 72 hours. In one example, the rsCluHChk command calls rsMirrorVgChk every hour except during an IML, to detect problems with the boot process and to generate an appropriate errorlog entry, and to detect if it has been more than 72 hours since the cluster 102 has been in the mirroredvgstate 404. The presence of the /etc/rsmirrorvgoverride touch file will cause rsMirrorVgChk to log an error in the errorlog if it has been more than 72 hours that the cluster 102 has not been in the mirroredvgstate 404. If the touch file is not present, after 72 hours the cluster 102 will be returned to the mirroredvgstate 404. An exception to this is when the cluster 102 is in the singlevgstate 402, and in this case the cluster 102 will not be put into the mirroredvgstate 404 and will be left in the singlevgstate 402.

In one example, to enter the mirroredvgstate 404, harddrive build calls rsChangeVgState with the mirroredvg parameter at the end of the rsHDload. As a result, the rootvg is mirrored onto the second hard drive 120 and the cluster 102 is put into the mirroredvgstate 404. The bootlist is set to the appropriate value by rsChangeVgState or by one of the commands it calls.

Clonedvgstate 406: During the clonedvgstate 406 there are two volume groups. The two volume groups are the original rootvg, which is currently in use on the first hard drive 118, and a cloned version of the rootvg (called the altinst_rootvg) on the second hard drive 120. Configuration changes are prohibited when a cluster is in the clonedvgstate 406, consequently, it is desirable to return to the mirroredvgstate 404 as soon as possible after a code update is completed. When the cluster 102 is in the clonedvgstate 406, the rsAltInst command may be used to update code in the altinst_rootvg on the clone hard drive (for example, the second hard drive 120). After the code on the second hard drive 120 has been updated, the cluster 102 may be booted from the second hard drive 120, after calling the rsChangeVgState command with the altbootvgstate parameter, which will prepare the cluster 102 for booting the new level of code. Rebooting the cluster 102 will put the cluster 102 into the altbootvgstate 408. There are three valid target states from the clonedvgstate 406, which are, the singlevgstate 402, the mirroredvgstate 404 (return to mirroring with the original code version), and the altbootvgstate 408 (booted from the clone with the updated code version).

Altbootvgstate 408: In this state the cluster 102 has booted from the clone hard disk drive (for example, the second hard drive 120). When the cluster 102 is booted from the second hard drive 120, the rootvg on the first hard drive 118 is renamed "old_rootvg" and the altinst_rootvg on the boot device (hard drive 120) is renamed "rootvg". The cluster 102 will be running the new version of code which is loaded in this "renamed" rootvg. If it is desired to restore the previous code level (the previous version of the code), the cluster 102 may be rebooted from the first hard drive 118 containing the old_rootvg, after calling the rsChangeVgState command with the clonedvgstate parameter to prepare the cluster 102 for switching back to the previous version of code. After the reboot from the first hard drive 118, the cluster 102 may be returned to the clonedvgstate 406 and the volume groups will be renamed accordingly. After returning to the clonedvgstate 406, if another attempt at installation of the update is not desired until a later time, the cluster 102 may transition from the clonedvgstate 406 to the singlevgstate 402 to the mirroredvgstate 404. If it is desired to keep the updated version of the code, calling the rsChangeVgState command with the mirroredvgstate 404 parameter commits the cluster 102 to the updated code, and returns the cluster to the mirroredvgstate 404.

Updateclonestate 410: This is a transient state used only by the rsAltInst command (which for example, is an executable, a shell, or an "exe" in C). The cluster 102 will be in this transient state while the rsAltInst command is running. This transient state is needed to allow writing to the filesystem on the clone hard disk (for example, the second hard drive 120). The cluster 102 must be put into the clonedvgstate 406 prior to executing the rsAltInst command. After the rsAltInst command has completed the cluster 102 is returned to the clonedvgstate 406. The rsChangeVgState command cannot be used to switch into, or out of the updateclonestate 410.

Figure 5:
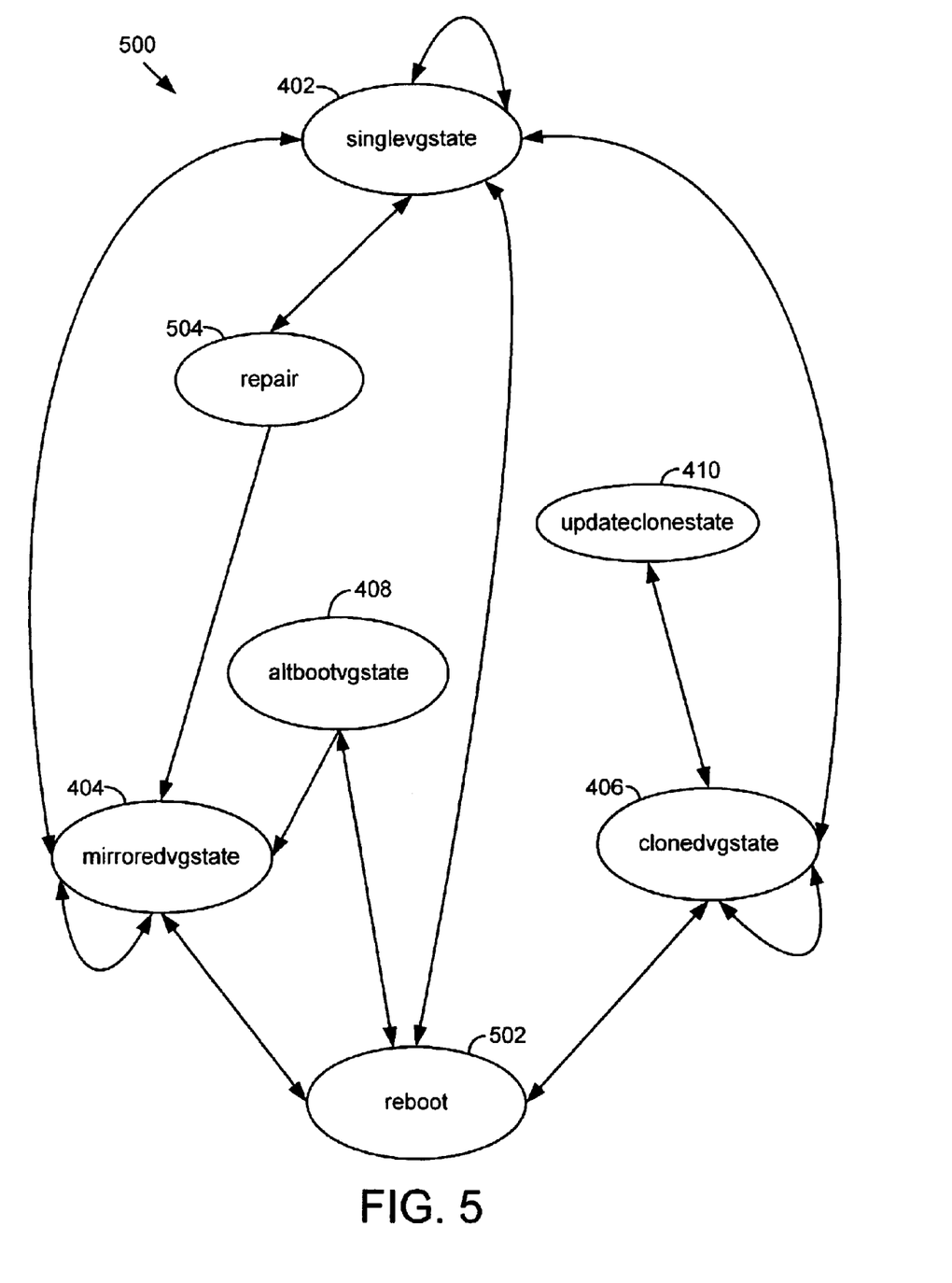
FIG. 5 is another state diagram in accordance with an example of the invention.

The state diagram 500 in FIG. 5 illustrates additional states and state transitions. The state diagram 500 shows that the singlevgstate 402 is utilized to transition from the mirroredvgstate 404 to the clonedvgstate 406, or from the clonedvgstate 406 to the mirroredvgstate 404. The state diagram 500 also shows the reboot state 502, which is a transient state that is utilized between the altbootvgstate 408 and the clonedvgstate 406, when it is desired to restore the original version of the code on the first hard drive 118 after the altbootvgstate 408. If an update is unsatisfactory, then the cluster 102 may transition from the altbootvgstate 408 to reboot 502 to clonedvgstate 406. FIG. 5 also shows the repair state 504, which is a transient state that the cluster 102 may automatically or manually enter if a problem is detected. As mentioned above, if a problem is detected while the cluster 102 is in the mirroredvgstate 404, the cluster 102 may automatically or manually transition to the singlevgstate 402. The cluster 102 may then transition to the repair state 504. The repair may be conducted while the cluster 102 is in the repair state 504. For example, a defective hard drive could be replaced. After the repair is completed, the cluster 102 may transition from the repair state 504 to the mirroredvgstate 404. Reboot 502, repair 504, and updateclonestate 410 may be referred to as transient conditions rather than as transient states.

Table 1 below shows hard disk drive states and their allowable transition states.

TABLE 1

| Volume Groups | Current State | Allowable Final States |
| --- | --- | --- |
| Rootvg (1 physical vol) or rootvg (2 vols unmirrored) | singlevgstate | mirroredvgstate clonedvgstate |
| rootvg (mirrored) | mirroredvgstate | clonedvgstate singlevgstate |
| rootvg + altinst_rootvg | clonedvgstate | altbootvgstate mirroredvgstate singlevgstate |
| rootvg + old_rootvg | altbootvgstate | clonedvgstate mirroredvgstate |
| rootvg + foreignvg | singlevgstate | mirroredvgstate |
| rootvg + any | any state other than singlevgstate | singlevgstate |
| See rsAltInst command below | updateclonestate | clonedvgstate |
| See rsQueryVgState command below | BUSY | any |

D. Commands

The following are examples of commands that may be used to implement aspects of the invention.

rsChangeVgState: This routine will perform a volume group state change. The input parameter is the target state. There are four valid states: singlevgstate 402, mirroredvgstate 404, clonedvgstate 406, and altbootvgstate 408. Switching back and forth between the clonedvgstate 406 and the altbootvgstate 408 requires a shutdown and reboot of the cluster 102 to complete the state change.

RsMirrorVgChk: This routine will return the cluster 102 to the mirroredvgstate 404 after 72 hours at any other state except the singlevgstate 402. This routine is called by rsCluHChk (except during IML) and does the following checks: If /etc/rsmirrorvgoverride exists and the /etc/rs/BootFile is over 72 hours old, the current state will not be changed but an error will be logged. If /etc/rsmirrorvgoverride does not exist, and the /etc/rsBootFile is over 72 hours old, the cluster 102 will be returned to the mirroredvgstate 404.

rsBootListCmd: This routine will change the boot list. The rsBootListCmd accepts the following parametsrs: -n Normal boot, -c Boot from the second hard drive 120, -s Boot from single disk.

RsBootChk: This routine is called during IML and will check and reset the bootlist to normal if it contains a single hdisk entry. The normal values are either: fd0, cd0, hdisk0, hdisk1; or, fd0, cd0, hdisk1, hdisk0; depending on which hard drive 118, 120 is the target boot device.

RsMirrorVg: This routine will mirror the rootvg onto both hard drives 118, 120 in the cluster 102, and also performs whatever cleanup of the hard drives 118, 120 is necessary prior to the actual mirroring process.

RsCloneVg: This routine will clone the rootvg onto the standby hard disk (for example, hard drive 120). This routine is called by rsChangeVgState to check the target disk, unmirror the rootvg, remove the target disk from the rootvg volume group, and then clone the rootvg onto the target disk drive.

RsAltInst: This is a RAS wrapper shell for the alt_disk_install command. This command calls the alt_disk_install function to update code on the clone hard disk drive (for example, hard drive 120). The following parameters are supported: -b bundle_name (Pathname of optional file containing a list of packages or filesets that will be installed); -I installp_flags (flags passed to installp command, Default flags are: "-acgX"); -f fix_bundle (Optional file with a list of APARs to install); -F fixes (Optional list of APARs to install); −1 images_location (Location of installp images or updates to apply); -w fileset (List of filesets to install. The −1 flag is used with this option).

RsSingleVg: This routine is called by rsChangeVgState to return the cluster 102 to a single hard disk rootvg state as part of the state transition management.

RsQueryVgState: This function is called to query the state of the disks (for example, hard drives 118, 120). One of the following six disk states is returned to standard out: GOOD—The current state and request state are both the same and the two hard drives 118, 120 are in good condition; BUSY—The volume group is busy performing the requested operation and the two hard drives 118, 120 are in good condition; INCOMPLETE—The current state and target state are not the same; ILLEGAL—The current state was not a result of an rsChangeVgState; 1DISK—There is only one usable hard disk drive, the drive shown has failed or is not installed; ERROR—A command failed or an unsupported operation was requested.

Rs2DiskConfiguredDev: This routine will remirror the logical volumes of the two hard drives 118, 120 after a repair, and is called by rsBootChk during IML, or by the Repair Menu to force a mirror after a hard drive replacement.

Rs2DiskClearBusy: This routine is used to recover a cluster that is stuck in the BUSY state, and is called by other routines when necessary.

rsAltAccess: This routine is used to run commands against the offline hard drive, or to move or copy files between the two hard drives 118, 120. When running this command the "actual" filesystem names must be used to differentiate between the current boot device (normal filesystem names) and the offline hard drive (/alt_inst/ . . . filesystem prefix name). The syntax is "rsAltAccess command from_directory to_directory". This command can take up to five minutes to complete due to having to mount the offline filesystem to complete the command. Also, not every command may be supported.

rsIdentifyDisk: This routine is used to identify a failing hard drive 118, 120, or to prepare a specified hard drive 118, 120 for replacement, and is called by other routines when necessary. rsIdentifyDisk (without other parameters) will examine the errlog and the device database to determine which hard drive 118, 120 should be replaced, and place that hard drive into service mode. Onscreen instructions will appear to guide the repair. rsIdentifyDisk <hdisk> (specify a hard disk name only) will put the specified hard drive into service mode and onscreen instruction will guide the repair. rsIdentifyDisk-Q<hdisk> (-Q and a hard disk name) will put the specified hard drive into service mode, but onscreen instructions will not appear, and is the field repair method.

The following is a discussion of aspects of the code update process with regard to some of the states and commands discussed above. The command ChangeVgState is used to manage volume group state transitions and to determine which code version will be booted. To load a new version of code, the updated code is copied into /usr/sys/inst.images/searas/next while the cluster 102 is in the mirroredvgstate 404. However, this process can also be accomplished using the rsAltInst command while the cluster 102 is in the clonedvgstate 406. For cases where it is desired to prevent rsMirrorVgChk from automatically mirroring the boot device after 72 hours, the presence of the file touch/etc/rsmirrorvgoverride is checked for before cloning, to ensure that this file is present in both the rootvg and the altnst_rootvg. To switch to the clonedvgstate 406, rsChangeVgState is called with the clonedvgstate parameter. The rsAltInst command calls the alt_disk_install command to update the code in the altinst_rootvg on the cloned hard drive. To boot the updated code, rsChangeVgState is called with the altbootvgstate parameter. To commit the new level of code, rsChangeVgState is called with the mirroredvgstate parameter. To return to the clonedvgstate 406 from the altbootvgstate 408, rsChangeVgState is called with the clonedvgstate parameter. Returning to the clonedvgstate 406 will return the cluster 102 to the previous code version, but will keep the cluster 102 in a state that allows additional code updates.

III. Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A signal bearing medium tangibly embodying a program of machine-readable instructions executable by a digital processing apparatus to perform a method for managing storage devices and updating code in a computing system, the method comprising the following operations:

mirroring at least one logical volume in an original volume group on at least a first storage device and a second storage device;

ceasing mirroring the at least one logical volume in the original volume group on the second storage device;

keeping the first storage device on-line with the computing system;

copying information from the first storage device onto the second storage device to clone the information from the first storage device;

updating code in an alternate volume group on the second storage device while operating the computing system with the original volume group on the first storage device; and booting the computing system from the alternate volume group on the second storage device.

2. The signal bearing medium of claim 1, wherein the method further comprises:

determining whether there is an error after booting the computing system from the alternate volume group on the second storage device,
and if not,
mirroring at least one logical volume in the alternate volume group on at least the first storage device and the second storage device,
and if so,
booting the computing system from the original volume group.

3. The signal bearing medium of claim 1, wherein the method further comprises copying updated information from the first storage device to the second storage device, prior to the operation of booting the computing system from the alternate volume group on the second storage device, wherein the updated information is information that was updated on the first storage device after the operation of ceasing mirroring the at least one logical volume in the original volume group on the second storage device.

4. The signal bearing medium of claim 1, wherein the first storage device is a disk drive, and the second storage device is a disk drive.

5. The signal bearing medium of claim 2, wherein at least one logical volume in the original volume group is not mirrored across the first storage device and the second storage device.

6. The signal bearing medium of claim 2, wherein the method further comprises mirroring the at least one logical volume in the original volume group on at least the first storage device and the second storage device, if in the determining operation it is determined that there is an error after booting the computing system from the alternate volume group on the second storage device.

7. The signal bearing medium of claim 2, wherein the operation of updating code in an alternate volume group on the second storage device includes putting the computing system in a transient updateclone state.

8. The signal bearing medium of claim 2, wherein the method further comprises determining if a prescribed time period has elapsed since performing the operation of mirroring at least one logical volume in the original volume group on at least the first storage device and the second storage device,
and if so, again performing the operation of mirroring at least one logical volume in the original volume group on at least the first storage device and the second storage device.

9. The signal bearing medium of claim 2 wherein the at least one logical volume in the original volume group is mirrored on the first storage device, the second storage device, and a third storage device.

10. The signal bearing medium of claim 9 wherein the at least one logical volume in the alternate volume group is mirrored on the first storage device, the second storage device, and the third storage device, if in the determining operation it is determined that there is not an error after booting the computing system from the alternate volume group on the second storage device.

11. The signal bearing medium of claim 9 wherein the at least one logical volume in the alternate volume group is mirrored on the first storage device and the second storage device, and the original volume group is left on the third storage device, if in the determining operation it is determined that there is not an error after booting the computing system from the alternate volume group on the second storage device.

12. The signal bearing medium of claim 2 wherein the original logical volume and the alternate logical volume are root volumes.

13. The signal bearing medium of claim 2 wherein the code that is updated is operating system code.

14. The signal bearing medium of claim 2 wherein the code that is updated is computer system configuration information.

15. A signal bearing medium tangibly embodying a program of machine-readable instructions executable by a digital processing apparatus to perform a method for managing storage devices and updating code in a computing system, the method comprising the following operations:
mirroring a plurality of logical volumes in an original volume group on a first disk drive and a second disk drive;
ceasing mirroring the plurality of logical volumes in the original volume group on the second disk drive;
keeping the first disk drive on-line with the computing system;
copying all of the information on the first disk drive onto the second disk drive to make a clone of the first disk drive, wherein the information on the second disk drive includes an alternate volume group;
updating code in the alternate volume group on the second disk drive while operating the computing system with the original volume group on the first disk drive;
copying updated information from the first disk drive to the second disk drive, wherein the updated information is information that was updated on the first disk drive after the operation of ceasing mirroring the plurality of logical volumes in the original volume group on the second disk drive;
booting the computing system from the alternate volume group on the second disk drive; and
determining whether the code update in the alternate volume group on the second disk drive is satisfactory after booting the computing system from the alternate volume group on the second disk drive,
and if so,
mirroring a plurality of logical volumes in the alternate volume group across the first disk drive and the second disk drive,
and if not,
booting the computing system from the original volume group on the first disk drive.

16. The signal bearing medium of claim 15, wherein the method further comprises mirroring the plurality of logical volumes in the original volume group on the first disk drive and the second disk drive, if in the determining operation it is determined that there is an error after booting the computing system from the alternate volume group on the second disk drive.

17. The signal bearing medium of claim 16, wherein the method further comprises determining if a prescribed time period has elapsed since performing the operation of mirroring the plurality of logical volumes in the original volume group on the first disk drive and the second disk drive, and if so, again performing the operation of mirroring the plurality of logical volumes in the original volume group on the first disk drive and the second disk drive.

18. A storage apparatus, comprising:
a first storage memory;
a first dedicated adapter;
a non-volatile storage coupled to the first dedicated adapter;
a first disk drive;
a second disk drive; and a first plurality of processors coupled to the first storage memory; the first dedicated adapter, the first disk drive, and the second disk drive, wherein the first plurality of processors are programmed to perform operations for updating code on the first disk drive and the second disk drive, the operations comprising:
  mirroring at least one logical volume in an original volume group on the first disk drive and the second disk drive;
  ceasing mirroring the at least one logical volume in the original volume group on the second disk drive;
  keeping the first disk drive on-line with the computing system;
  copying information from the first disk drive to the second disk drive to clone the information from the first disk drive;
  updating code in an alternate volume group on the second disk drive while operating the computing system with the original volume group on the first disk drive;
  copying updated information from the first disk drive to the second disk drive, wherein the updated information is information that was updated on the first disk drive after the operation of ceasing mirroring the at least one logical volume in the original volume group on the second disk drive;
  booting the computing system from the alternate volume group on the second disk drive; and
  determining whether there is an error after booting the computing system from the alternate volume group on the second disk drive,
    and if not,
      mirroring at least one logical volume in the alternate volume group on the first disk drive and the second disk drive,
    and if so,
      booting the computing system from the original volume group on the first disk drive.

19. The storage apparatus of claim 18, further comprising:
  a second storage memory;
  a second dedicated adapter coupled to the non-volatile storage;
  a third disk drive;
  a fourth disk drive;
  a second plurality of processors coupled to the second storage memory, the second dedicated adapter, the third disk drive, and the fourth disk drive; and
  a plurality of shared adapters coupled to the first plurality of processors and the second plurality of processors.

20. A method for managing storage devices and updating code in a computing system, the method comprising the following operations:
  mirroring at least one logical volume in an original volume group on at least a first storage device and a second storage device;
  ceasing mirroring the at least one logical volume in the original volume group on the second storage device;
  keeping the first storage device on-line with the computing system;
  copying information from the first storage device to the second storage device to clone the information from the first storage device;
  updating code in an alternate volume group on the second storage device while operating the computing system with the original volume group on the first storage device; and
  booting the computing system from the alternate volume group on the second storage device.

21. The method of claim 20, further comprising:
  copying updated information from the first storage device to the second storage device, prior to the operation of booting the computing system from the alternate volume group on the second storage device, wherein the updated information is information that was updated on the first storage device after the operation of ceasing mirroring the at least one logical volume in the original volume group on the second storage device; and
  determining whether there is an error after booting the computing system from the alternate volume group on the second storage device,
    and if not,
      mirroring at least one logical volume in the alternate volume group on at least the first storage device and the second storage device,
    and if so,
      booting the computing system from the original volume group.

22. The method of claim 21, further comprising:
  ascertaining whether a prescribed time period has elapsed since performing the operation of mirroring at least one logical volume in the original volume group on at least the first storage device and the second storage device,
  and if so, again performing the operation of mirroring at least one logical volume in the original volume group on at least the first storage device and the second storage device.

23. The method of claim 22, further compising:
  mirroring the at least one logical volume in the original volume group on at least the first storage device and the second storage device, if in the determining operation it is determined that there is an error after booting the computing system from the alternate volume group on the second storage device.

24. A computing apparatus, comprising:
  means for mirroring at least one logical volume in an original volume group across at least a first storage device and a second storage device;
  means for ceasing mirroring the at least one logical volume in the original volume group on the second storage device;
  means for keeping the first storage device on-line with the computing system;
  means for copying information from the first storage device to the second storage device to clone the information from the first storage device;
  means for updating code in an alternate volume group on the second storage device while operating the computing system with the original volume group on the first storage device;
  means for booting the computing system from the alternate volume group on the second storage device; and
  means for mirroring at least one logical volume in the alternate volume group across at least the first storage device and the second storage device.

* * * * *